5 Sheets—Sheet 1.

J. KENNEDY & H. AIKEN.

HYDRAULIC CRANE.

No. 11,164. Reissued May 5, 1891.

Witnesses
H. L. Gill
A. M. Monroe

Inventors
Julian Kennedy
Henry Aiken
by W. Bacuell & Sons
Attorneys

5 Sheets—Sheet 2.

J. KENNEDY & H. AIKEN.

HYDRAULIC CRANE.

No. 11,164. Reissued May 5, 1891.

Witnesses
H. L. Gill
A. M. Comwell

Inventors
Julian Kennedy
Henry Aiken
by W. Baxendell & Son
Attorneys

5 Sheets—Sheet 3.
J. KENNEDY & H. AIKEN.
HYDRAULIC CRANE.
No. 11,164. Reissued May 5, 1891.
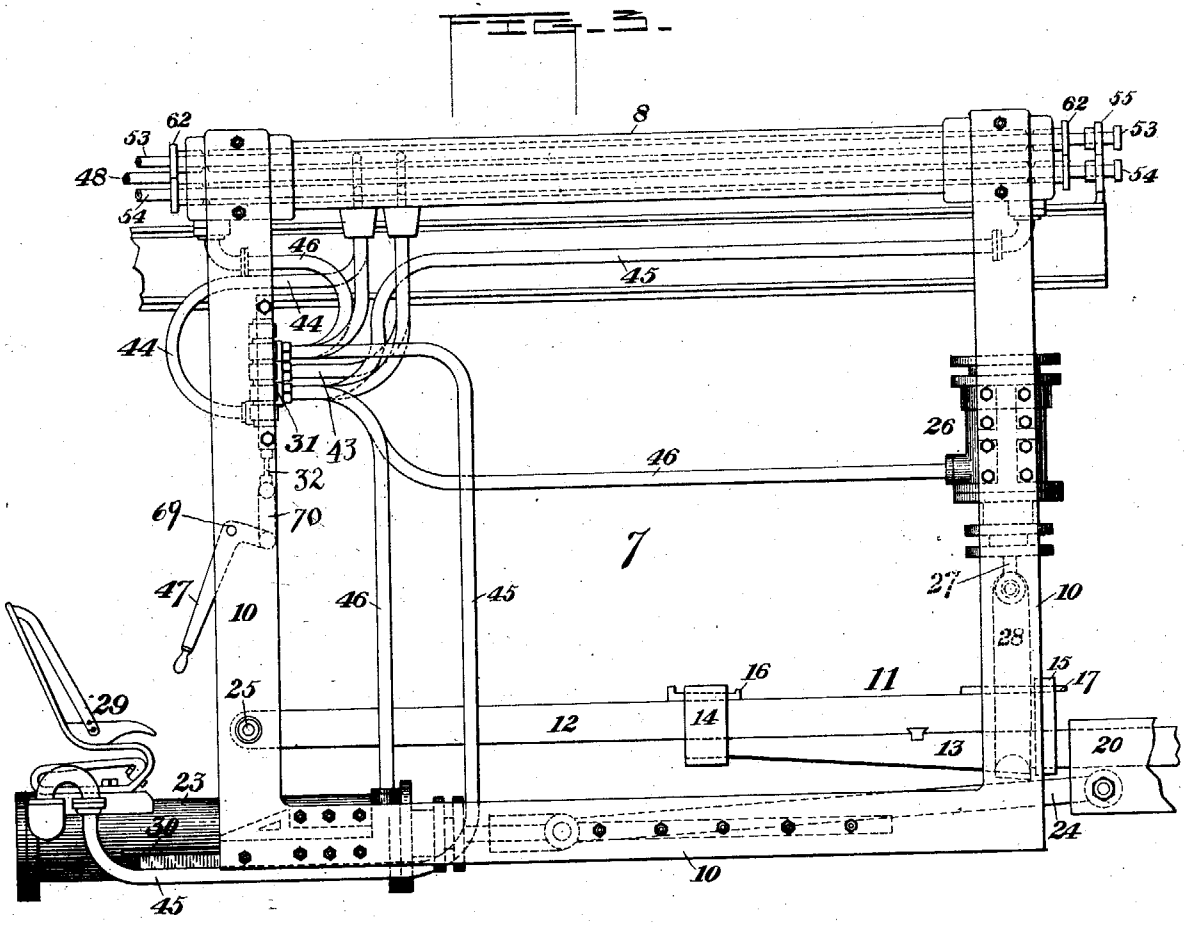
Witnesses
H. L. Gill.
A. M. Clemmin
Inventors
Julius Kennedy
Henry Aiken
by W. Baxendell & Son
Attorneys.

5 Sheets—Sheet 4.
J. KENNEDY & H. AIKEN.
HYDRAULIC CRANE.
No. 11,164. Reissued May 5, 1891.
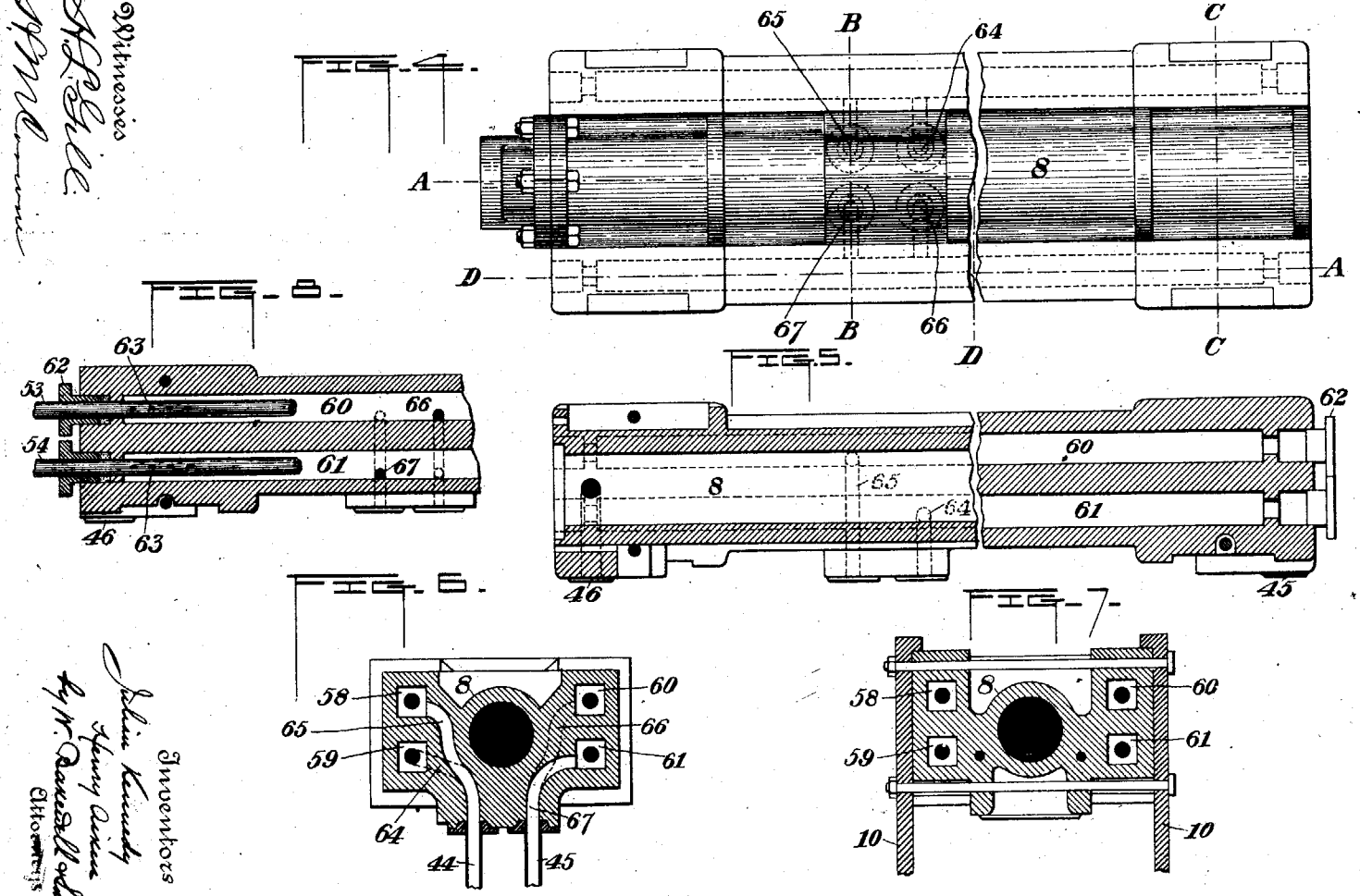
Witnesses
H. L. Gill
H. M. Connine
Inventors
Julius Kennedy
Henry Aiken
by W. Bakewell & Son
Attorneys

J. KENNEDY & H. AIKEN.

HYDRAULIC CRANE.

No. 11,164. Reissued May 5, 1891.

Witnesses
H. L. Gill
J. M. Clemson

Inventors
Julian Kennedy
Henry Aiken
by W. Bakewell & Son
Attorneys

UNITED STATES PATENT OFFICE.

JULIAN KENNEDY, OF LATROBE, AND HENRY AIKEN, OF PITTSBURG, PENNSYLVANIA.

HYDRAULIC CRANE.

SPECIFICATION forming part of Reissued Letters Patent No. 11,164, dated May 5, 1891.

Original No. 412,351, dated October 15, 1889. Application for reissue filed August 16, 1890. Serial No. 362,234.

*To all whom it may concern:*

Be it known that we, JULIAN KENNEDY, of Latrobe, in the county of Westmoreland and State of Pennsylvania, and HENRY AIKEN, of Pittsburg, in the county of Allegheny and State of Pennsylvania, have invented a new and useful Improvement in Hydraulic Cranes; and we do hereby declare the following to be a full, clear, and exact description thereof, reference being had to the accompanying five sheets of drawings, in which—

Figure 1:
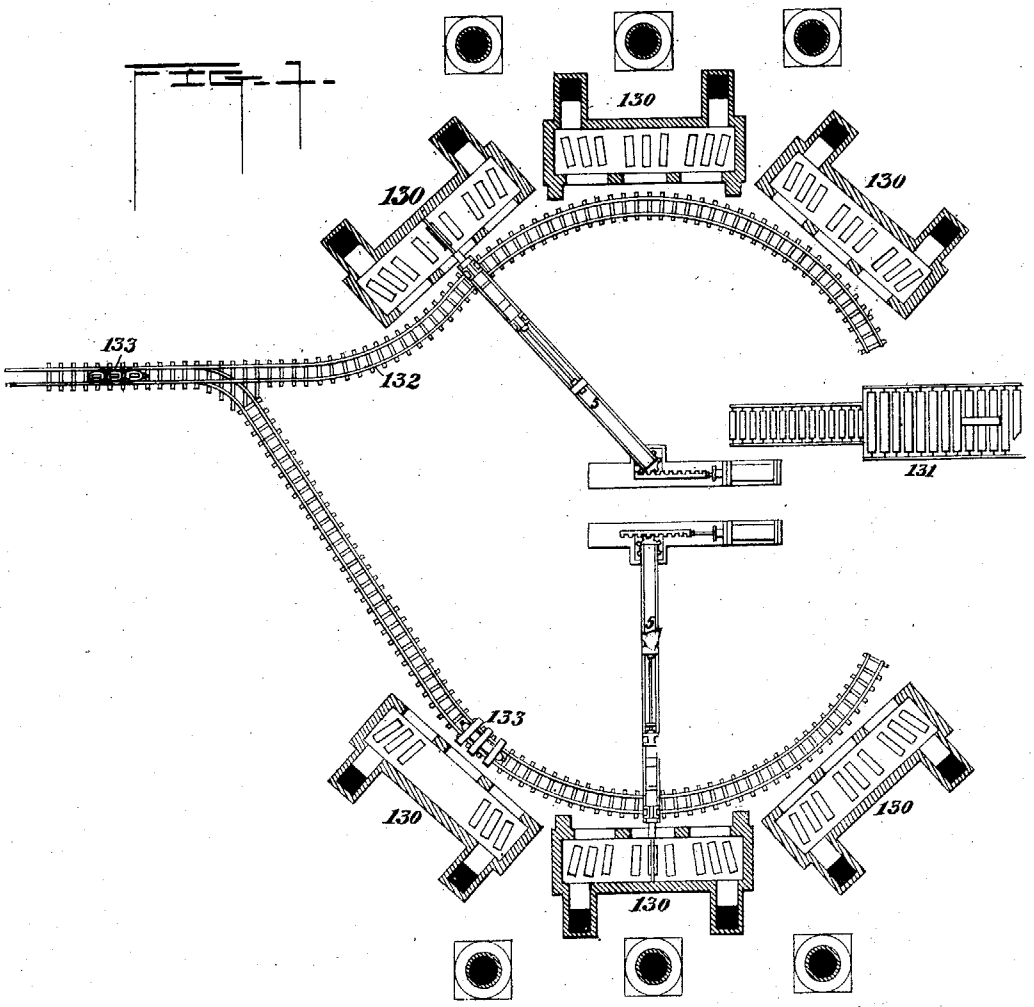
Figure 2:
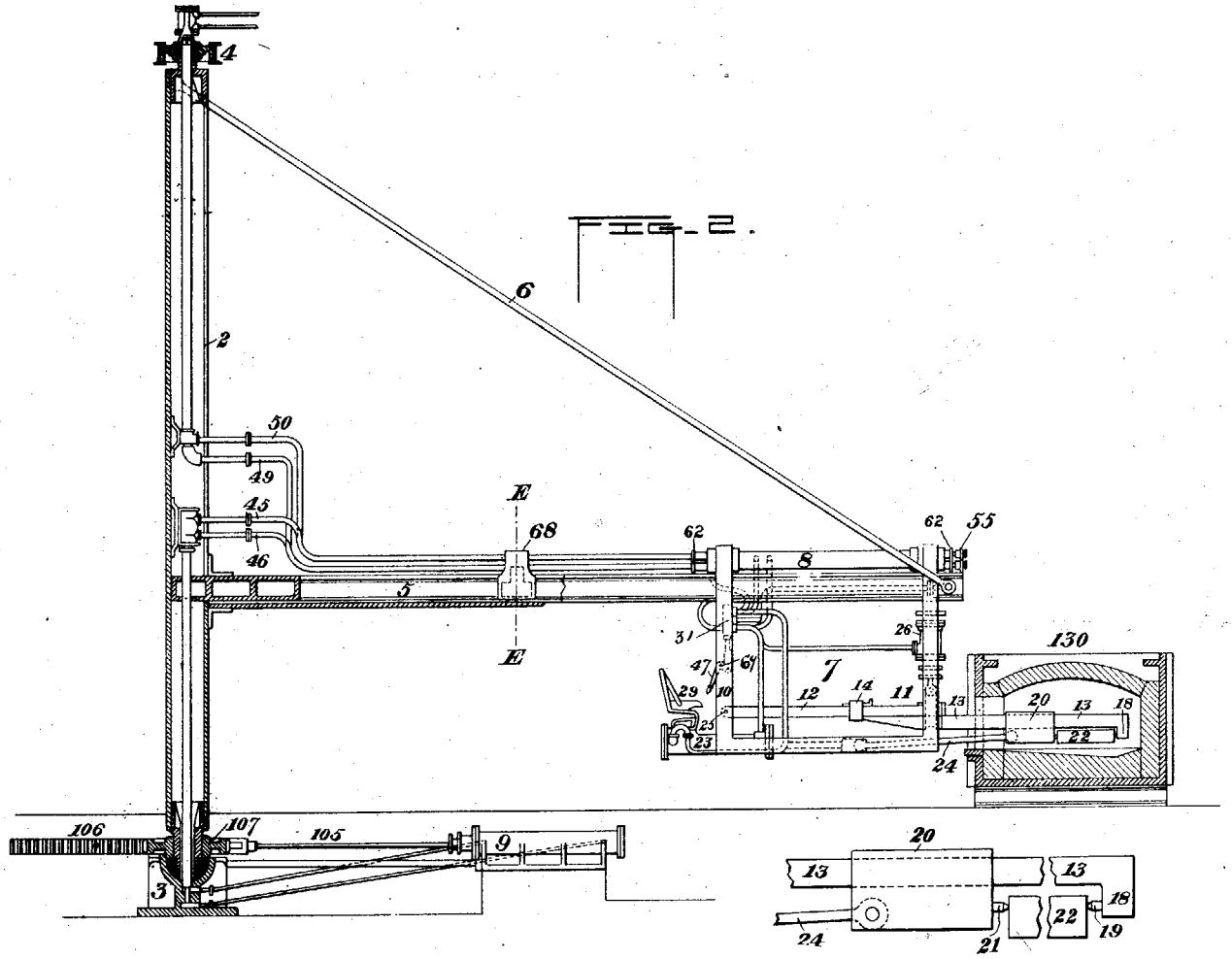
Figure 10:
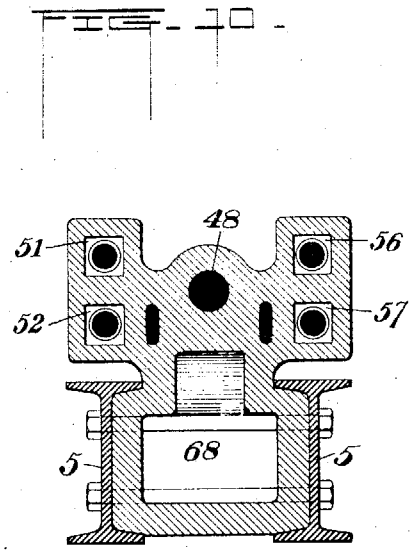
Figure 9:
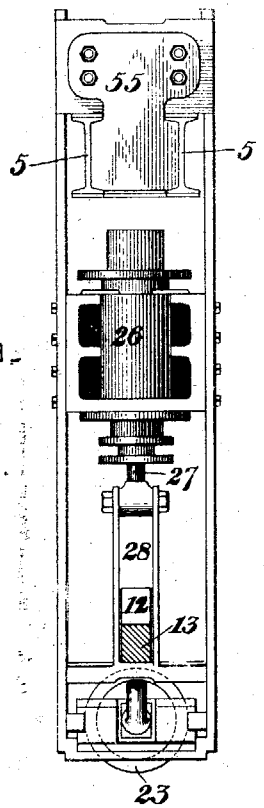

Figure 1, Sheet 1, is a plan view of the cranes, heating-furnaces, and the tables of the plate or other rolling mill used in connection with the furnaces. Fig. 2, Sheet 2, is an elevation of our improved crane, illustrating its operation in connection with one of the heating-furnaces, which is shown in section. Fig. 3, Sheet 3, is a side elevation of the carriage and racking-cylinder and connections. Fig. 4, Sheet 4, is a plan view of the racking-cylinder. Figs. 5, 6, 7, and 8, Sheet 4, are sectional views of the racking-cylinder on the line A A, B B, C C, and D D in Fig. 4. Fig. 9, Sheet 5, is a front elevation of the jib and carriage. Fig. 10, Sheet 5, is a cross-section of the supporting-casting of the jib on the line E E, Fig. 2.

In describing our invention we will begin with the construction of the crane, an elevation of which is shown in Fig. 2, Sheet 2. It has a hollow iron mast 2, the lower end of which rests and turns in a base-plate 3 and the upper end of which is steadied and turns in a steadiment 4. It has also a jib 5, composed of channel or other suitable bars of iron or steel, the outer end of which is supported from the top of the mast by an eye-bar or eye-bars 6. Suspended on the jib is a carriage 7, which carries the gripping devices, the operator's seat, and the valves and valve-levers which control the movements of the crane. The carriage is moved by a cylinder 8, called the "racking-cylinder," mounted on the jib. The water-supply and waste pipes extend down through the mast and out along the jib, and thence to the valve-chamber. Circulating-pipes also lead from one of the valves on the carriage to a cylinder 9, placed at or near the base of the crane, to operate the piston which turns the crane.

*The carriage.*—The carriage 7, Fig. 3, Sheet 3, which is mounted on the jib, is composed of two rectangular iron frames 10, which are suspended from the opposite sides of the racking-cylinder 8 and are fastened together by the various parts and structures which are placed between and supported by them. Extending longitudinally near the bottom of the carriage is the lifting-bar 11, Figs. 2 and 3, which is composed of two pieces 12 and 13, secured together by clamping-sleeves 14 and 15, fastened by wedges or keys 16 and 17. The piece 13 extends beyond the end of the carriage 7 and at its outer end has a downward extension 18, having an inwardly-projecting spur 19. Mounted on the part 13, which acts as a guide thereto, is a slide 20. This slide is provided at its outer end with a spur 21 and constitutes the other member of the gripping mechanism, as is clearly shown in Fig. 2 and the accompanying enlarged detail, where the two spurs 19 and 21 are shown as gripping an ingot 22 between them. The slide 20 is operated by a horizontal cylinder 23 mounted on the carriage, the piston of which is connected with the slide by a pitman 24, Figs. 2 and 3. The rear end of the bar 11 is pivoted to the carriage at 25, and a vertical movement or oscillation on its pivot 25 is given to the bar to enable it to pick up and lay down an ingot or other burden by means of a vertical cylinder 26 mounted between the vertical side frames 10 at the outer end of the carriage, Figs. 3 and 9, the piston-rod 27 of which is connected by a yoke 28 with the bar 11, said yoke reciprocating vertically between the side frames 10 of the carriage, and thereby raising or lowering the outer or gripping end of the bar 11. The bar 11 is made in two parts 12 and 13, because the outer end enters the furnace and is liable to become warped and distorted thereby, or to be bent by the weight of the burden. In such case the whole bar does not have to be replaced, but only the outer or injured part 13, which is easily done by loosening the keys 16 and 17. The operator's seat 29 is placed on the cylinder 23, and platforms 30 are provided, so that he need not stand nor step on the cylinder. 31 are the valves which control the several cylinders above mentioned.

the details of construction of which valves are described in reissue application, Serial No. 362,233, filed by us herewith. 44 is a common waste-pipe for all the valves. 45 and 46 are pipes leading from the valves to the ends of the cylinders 8, 9, 23, and 26. 47 represents one of the valve-levers by which the water may be caused to enter either end of any of said cylinders.

*The racking-cylinder.*—At a proper point on the jib 5 is a rigid casting 68, Figs. 2 and 10, which supports the stationary piston-rod 48 of the racking-cylinder 8, the main supply and waste pipes, and the circulating-pipes which lead to the cylinder 9. The racking-cylinder 8, carrying the carriage 7, reciprocates on the stationary piston-rod 48, which is secured in the middle opening of the casting 68. The main supply and waste pipes 49 and 50 lead from the mast 2 to the left-hand chambers 52 and 51 of the casting. Fastened in the other end of these chambers are pipes 53 and 54, which extend to the end of the jib beyond the end of the racking-cylinder 8, and are there supported by a suitable plate 55, Figs. 3 and 9. Similar pipes extend from the right-hand chambers 56 and 57 of the casting, but these pipes are designed, as will be hereinafter described, to convey the water to and from the cylinder 9. The racking-cylinder 8 (see Figs. 4, 5, 6, 7, and 8) is cast with side wings, in which are four waterways 58, 59, 60, and 61, two in each wing. The pipes 53 and 54 from the chambers 51 52 extend through the ways 58 59, and the pipes from the chambers 56 57 extend through the ways 60 61, and the ends of the ways are closed around the pipes by glands or stuffing-boxes 62, Figs. 3, 5, and 8, which permit the cylinder to slide freely over the pipes and yet prevent the escape of the water. The pipes 53 54 and their companion pipes on the other side of the cylinder are perforated, as at 63, Fig. 8, to permit the passage of water at a point which when the cylinder 8 is at its outermost position shall still be within the water-ways. Communication is had between the chambers 58 and 59 and the valve-chamber of the valves 31 by means of the ports 64 and 65, Figs. 3 and 6, with which the supply and waste pipes 43 and 44 connect. The port 64 (shown in broken lines in Fig. 6) extends through the cylinder-casting from the waterway 59 to the pipe 43, which leads thence to the valve 31, and the port 65 (shown in full lines in Fig. 6) extends through the cylinder-casting from the water-way 58 to the pipe 44, which extends thereto from the waste-passage of the valve 31. In Fig. 6 the like ports on the opposite side of the cylinder are clearly shown. These ports 66 67 connect the water-ways 60 61 with the pipes 45 46 leading to the valve which controls the operation of the cylinder 9. The cylinders 8, 9, and 23 have each valve-connection pipes 45 46, while the cylinder 26 has but one pipe 46. This cylinder is vertical, and its piston maintains the weight of the bar 11. The pipe 46, when the valve is depressed, admits the water under the piston and raises it; but when the valve is raised and communication is opened between the pipe 46 and the waste-passage of the valve, the weight of the piston and the bar 11 forces the water back through the pipe 46 into the waste-passage and the piston descends. The pipes 45 46 of the racking-cylinder 8 are connected to its opposite ends, as shown in Figs. 3 and 5 and in Fig. 4. The valves are operated by bell-cranks or levers 47, mounted on a cross-shaft 69 between the side frames 10 in front of the operator's seat 29, said levers being connected with the valve-stems 32 by links 70. (See Fig. 3.) The supply and waste pipes of the several cylinders are shown in Figs. 2 and 3, and are described in the specification of our said reissue application.

*The rotating cylinder-connections.*—The cylinder 9, by means of which the crane is rotated, is placed on the ground in proper position with relation to the foot of the mast, Fig. 2. Its piston is connected by a rod 105 with a reciprocating rack 106, which engages a gear-wheel 107, mounted on the foot of the mast, Fig. 2. In Fig. 1 we illustrate the arrangement of two of our improved cranes as we have them in practical operation. The two cranes are arranged back to back in the center of a circle formed by six heating-furnaces 130, three of said furnaces being served by each of the cranes. The feed-table 131 of a plate or other rolling mill extends within the range of the jibs of the cranes, so that the latter can enter any one of its particular furnaces, seize an ingot therein, retract it from the furnace, and swing it around and deposit it upon the feed-table of the rolling-mill. The ingots are brought to the furnaces by a tramway or track 132, one branch of which lies in front of each group of furnaces. A suitable car 133, for conveying the cold ingots to the heating-furnaces, runs on this track, and the furnaces are charged by means of the cranes, the lifting mechanism seizing an ingot in the manner hereinbefore described as it lies on the car, lifting it, inserting it into the furnace, and after placing it properly therein releasing it and withdrawing from the furnace.

The entire operation of charging and discharging the furnaces and serving the rolling-mill is accomplished by the cranes without the intervention of any manual labor whatever, except that of the operator, who sits on the crane and manipulates the valves. From the time an ingot is placed on the car and the car is run to the furnaces it is not touched or moved by manual labor until after it is placed upon the mill-table. By reason of the capabilities of our improved crane and their utilization, as shown in Fig. 1, a great saving of time and labor is effected and the whole operation is carried on much more rapidly and with far greater precison than heretofore.

Thus constructed the operation of our improved crane is evident. The operator seated on the carriage is able to turn the crane in either direction by moving the lever of the valve which controls the circulation of water to the cylinder 9 to advance or retract the carriage and the lifting mechanism by moving the lever of the valve which controls the racking-cylinder 8 to raise or lower the lifting mechanism by moving the lever of the valve which controls the cylinder 26 and to actuate the gripping mechanism by moving the lever of the valve which controls the cylinder 23. All of the operating-valves being placed on the carriage, which is mounted on and travels with the jib, the operator moves with the jib and occupies a fixed position relatively to the work, such that he is always near it and has it under close inspection. This enables him to operate the crane with greater precision and rapidity and with less danger to the furnace and other objects with which it is used than can be done with any crane where the levers and operator's seat are on the mast or in some other place less favorable for inspection of and at a greater distance from the work. With such cranes there is constant liability of objects coming between the operator and the work, and as he is usually dependent upon signals for direction he is constantly liable to swing the burden against the side or roof of the furnace or other object and thereby injure it.

With our improved crane ingots and other objects can be introduced into or taken from furnaces and similar places horizontally with great accuracy and safety, the furnace can be very closely filled and the ingots moved therein by the operator alone and without the necessity of any signaling or additional labor except for opening and closing the doors of the furnace. The operator moves with and is always near the work, and by means of the several levers can operate the ponderous machine with immense loads with the ease and precision of a hand-tool.

While we have described and illustrated our invention for use with a gripping device for gripping and raising ingots, we do not wish to limit ourselves thereto, because the bar 11 may be provided with a forked or spade end, upon which the burden may be placed and by which it may be deposited in the furnace upon suitable rests, which will permit the fork or spade to be withdrawn from or inserted under the burden. In such case the cylinder 26 and the parts operated by it would be dispensed with.

The use of a movable racking-cylinder is an important feature, because it enables the carriage to travel back and forth with the work and thereby dispenses with the necessity of projecting the lifting-bar therefrom, and hence gives the bar a stronger and better support, renders it more manageable, and preserves the same distance between the end of the bar and the operator's seat.

It is necessary in order that the operator may have a fixed position to and close inspection of the work that his seat, the lifting mechanism, and the valves which control the movements of the racking-cylinder and lifting mechanism should be connected to and travel with the jib and that the carriage upon which the valves and lifting mechanism are carried should be moved by the racking-cylinder.

It is a great convenience, saves the necessity of an additional operator, and increases the rapidity and accuracy of the movements of the crane to add to the valves placed on the carriage the valve which controls the operation of the rotating cylinder 9; but this is not necessary to give the operator a fixed position with relation to the lifting devices, and therefore we do not desire to limit our claim for the means by which the latter end is effected by including therewith the placing of the valve of cylinder 9 on the carriage.

In the claims relating broadly to these combinations we do not wish it to be understood that we confine ourselves to a movable racking-cylinder, because, although we prefer that construction, the use of a stationary racking-cylinder mounted on the jib and a movable piston for actuating the carriage is an obvious equivalent and such a one as a person skilled in the art could substitute therefor. The same is also true of the connections between the circulating-pipes on the jib and the valves on the carriage.

It is a mere matter of calculation and arrangement on the part of the skilled person with our construction before him to substitute therefor others that will work, and therefore we do not by claims specifically setting forth our particular combinations wish to limit ourselves to their use in connection with matters covered by other claims.

It is apparent that the pivoted lifting-bar can be made to move sidewise instead of vertically to reach over the end of the ignot or other burden.

While we refer to our invention as an improvement in hydraulic cranes, we do not limit ourselves to the use of water, but include also steam, air, gas, oil, or other fluid as the equivalents thereof.

What we claim as our invention, and desire to secure by Letters Patent, is—

1. The combination of the carriage, the pivoted lifting-bar having an end projection, with a sliding gripper, and a cylinder with suitable water connections and valve to operate such sliding gripper, substantially as and for the purposes described.

2. The combination, with a crane and the jib, of a horizontal lifting-bar upheld by the jib and having a gripper at the end thereof, power devices for lifting said bar, and power devices for moving the bar horizontally along the jib, substantially as and for the purposes described.

3. The combination, in a crane, of the pivoted lifting-bar having a lateral projection or extension at the outer end with a reciprocating slide, which projection and slide constitute the gripping mechanism of the crane and act in conjunction to seize and hold the burden between them, substantially as and for the purposes described.

4. The movable carriage having mounted thereon and in combination therewith the pivoted lifting-bar and a hydraulic cylinder for giving it a short vertical oscillation, a sliding gripper capable of acting in conjunction with the lifting-bar to grip the load, a hydraulic cylinder for actuating the sliding gripper, and valves having suitable water connections with the source of water-supply and the said cylinders for the purpose of governing the operation of the cylinders, substantially as and for the purposes described.

5. In apparatus for charging furnaces, the combination of a movable jib, metal grippers carried thereby and adapted to be inserted horizontally into a furnace-door, and a power-motor connected with the grippers and adapted to operate them, substantially as and for the purposes described.

6. The combination of a laterally-movable jib, metal grippers carried thereby, a power-motor which acts on the grippers to project them longitudinally, and a power-motor connected with the grippers to cause their approach or separation, substantially as and for the purposes described.

In testimony whereof we have hereunto set our hands this 26th day of June, A. D. 1890.

JULIAN KENNEDY.
HENRY AIKEN.

Witnesses:
W. B. CORWIN,
H. M. CORWIN.